United States Patent [19]

Erdman et al.

[11] Patent Number: 5,080,460
[45] Date of Patent: Jan. 14, 1992

[54] CRIMP AND CLEAVE ASSEMBLY OF AN OPTICAL CONNECTOR AND METHOD OF MAKING SAME

[75] Inventors: David D. Erdman; Kevin T. Monroe; Alan E. Plotts, all of Harrisburg, Pa.

[73] Assignee: AMP Incorporated, Harrisburg, Pa.

[21] Appl. No.: 660,774

[22] Filed: Feb. 25, 1991

[51] Int. Cl.⁵ .............................................. G02B 6/26
[52] U.S. Cl. ........................................ 385/81; 385/83; 385/84
[58] Field of Search ............... 350/96.20, 96.21, 96.22, 350/96.23, 320

[56] References Cited

U.S. PATENT DOCUMENTS

| | | | |
|---|---|---|---|
| 4,133,601 | 1/1979 | Le Guen et al. | 350/96.21 |
| 4,190,317 | 2/1980 | Makuch | 350/96.20 |
| 4,236,787 | 12/1980 | Iacono et al. | 350/96.21 |
| 4,444,461 | 4/1984 | Wey et al. | 350/96.21 |
| 4,482,201 | 11/1984 | Dousset | 350/96.20 |
| 4,519,672 | 5/1985 | Rogstadius | 350/96.20 |
| 4,607,911 | 8/1986 | Rhodes | 350/96.20 |
| 4,679,895 | 7/1987 | Huber | 350/96.20 |
| 4,743,084 | 5/1988 | Manning | 350/96.21 |
| 4,828,351 | 5/1989 | Beinhaur | 350/96.20 |
| 4,834,487 | 5/1989 | Abendschein et al. | 350/96.20 |
| 4,938,558 | 7/1990 | Miller et al. | 350/96.20 |
| 4,961,624 | 10/1990 | Savitsky et al. | 350/96.20 |
| 4,964,685 | 10/1990 | Savitsky et al. | 350/96.20 |

OTHER PUBLICATIONS

Designer's Handbook, Feb. 1990, pp. 147, 148, 150, 151, Designing a No-Epoxy Connector.

Primary Examiner—Brian Healy
Attorney, Agent, or Firm—Gerald K. Kita

[57] ABSTRACT

An optical connector comprising, an alignment ferrule 11 receiving a plunger 38 and receiving an insert 35 between the plunger 38 and a constriction 32, the plunger 38 being constructed to receive an optical fiber 3 and a buffer 4 covering the optical fiber 3, the plunger 38 and the insert 35 being constructed for movement forwardly to compact the insert 35 in the constriction 32 and to apply compression concentrically on the optical fiber 3, and projecting barbs comprising a frictional surface 44 on the plunger 38 being force fit with corresponding ribs 47 along the alignment ferrule 11.

12 Claims, 6 Drawing Sheets

CRIMP AND CLEAVE ASSEMBLY OF AN OPTICAL CONNECTOR AND METHOD OF MAKING SAME

FIELD OF THE INVENTION

The invention relates to an optical connector for an optical fiber cable, particularly an optical connector constructed for assembly with an optical fiber cable without an adhesive.

BACKGROUND OF THE INVENTION

Photonics Spectra, February 1990, pp. 147, 148, 150, discloses an optical connector having a plunger to force resilient spheres into a constriction within a connector body. The spheres undergo compression and deformation around an optical fiber to clamp the fiber in the connector body. A rear of the plunger clamps radially on a buffer covering the fiber.

A known connector disclosed by U.S. Pat. No. 4,828,351 comprises a hollow connector body, a deformable insert having a central bore for receiving an optical fiber, and the insert is axially forced into a constriction in the hollow connector body to close the sidewall of the bore evenly upon the circumference of the optical fiber, whereby the optical fiber is frictionally retained in the bore and is concentrically aligned within the hollow body, and the insert is frictionally retained in the hollow body.

The known connector of the patent utilizes a cover and a ram tool for driving the cover into an open end of the hollow body. The cover and the ram enter the hollow body to drive the insert into the constriction. The ram is then withdrawn from the hollow body.

SUMMARY OF THE INVENTION

According to the invention, an optical connector includes a plunger for encircling a buffer portion of a buffer covered optical fiber. The plunger is inserted along the interior of a hollow connector body, along with the buffer covered optical fiber and a bare portion of the optical fiber encircled by a deformable insert.

An advantage of the invention resides in a clearance between the interior and a circumference of the plunger, barbs projecting outward from the circumference into the clearance, ribs along the passage projecting into the clearance toward the barbs, and the barbs being force fit against the ribs and restraining the plunger from movement rearward of the passage.

Another advantage of the invention resides in a frictional surface of the plunger force fit in the alignment ferrule to restrain the plunger from movement before an optical fiber is received by the plunger and the deformable insert.

Another advantage of the invention resides in an assembled optical connector having a deformable insert and a plunger held by a force fit in an alignment ferrule prior to receiving a buffer covered optical fiber in the connector.

For an understanding of the invention, reference will now be made by way of example to a following detailed description in conjunction with accompanying drawings.

DETAILED DESCRIPTION

Figure 1:
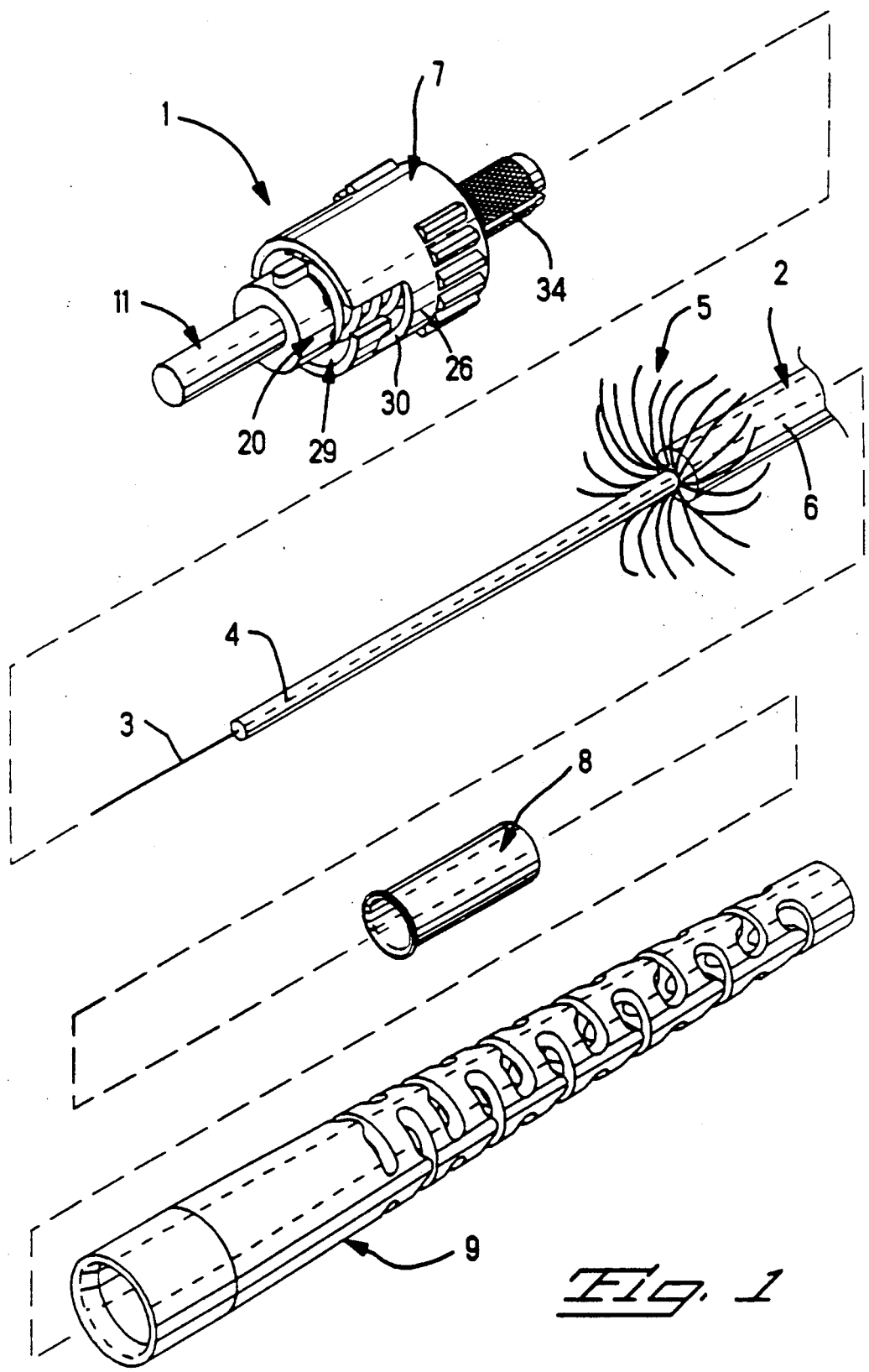
FIG. 1 is a fragmentary perspective view of a connector together with an optical fiber cable, a crimp sleeve and a strain relief depicted in exploded configuration.
Figure 2:
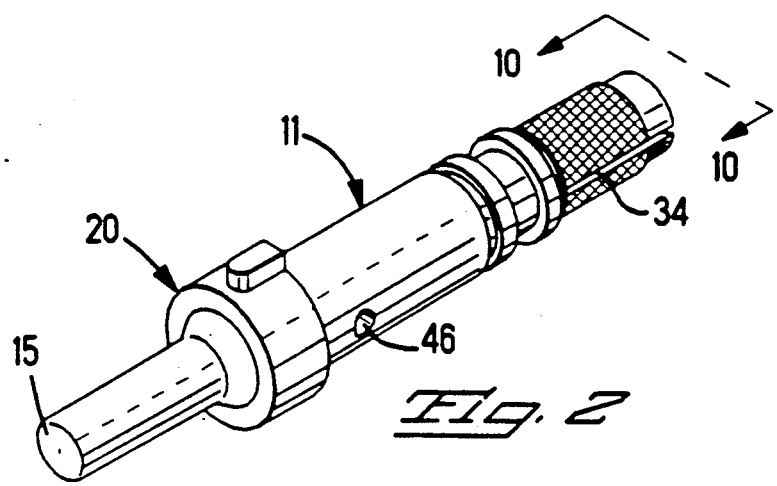
FIG. 2 is a perspective view of a portion of the connector as shown in FIG. 1.
Figure 3:
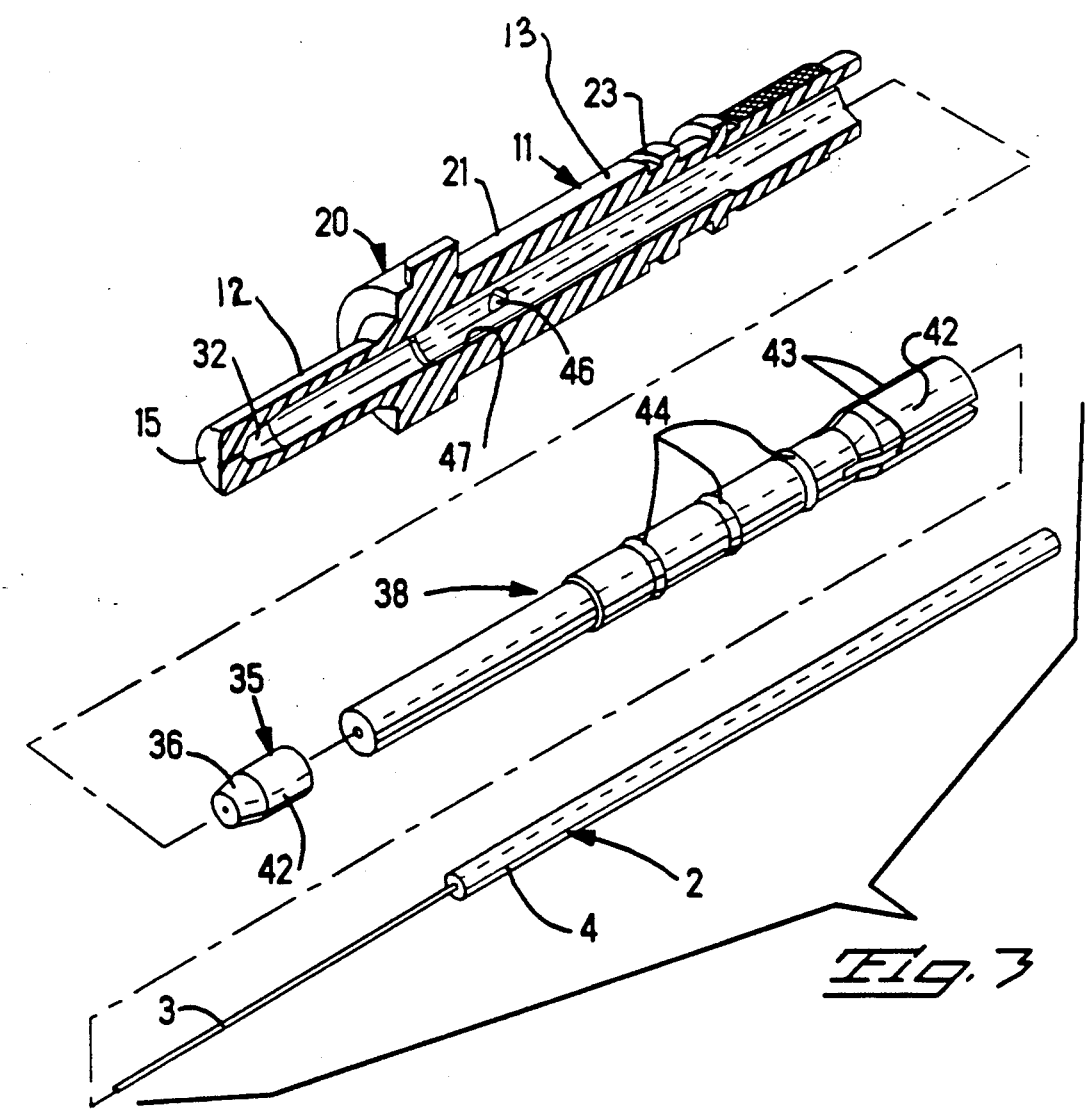
FIG. 3 is a perspective view of a cable and parts of the connector shown in FIG. 1.

With reference to FIGS. 1, 2 and 3, there is depicted, by way of example, a connector 1 for an optical fiber cable 2. The cable 2 includes an elongated central optical fiber 3 concentrically encircled by a buffer 4 together comprising a buffer covered fiber 3, 4. The cable 2 includes a load bearing portion in the form of elongated strength members 5 that extend axially along the cable 2. The strength members 5 are distributed over the outer diameter of the buffer covered fiber 3, 4. The cable 2 further includes an outer jacket 6 of polymeric material enclosing the strength members 5. Parts of the cable 2 are cut away as shown to provide a length of fiber 3 projecting from the buffer 4, and a length of the buffer covered fiber 3, 4 projecting from the strength members 5, and lengths of the strength members 5 projecting from the jacket 6.

The connector 1 includes an optical connector assembly 7 and a crimp ferrule 8. A tubular strain relief boot 9 also is shown. A variation of the connector 1 is shown in FIGS. 2 and 3 as a connector 10, with parts numbered the same as for similar parts of the connector 1. The connector 10 includes a rigid alignment ferrule 11 having a front portion 12 and a rear portion 13. The front portion 12 has an axial, central passage 14, of which a fiber receiving portion 31 extends concentrically with a front end 15 of the front portion 12 for aligning the optical fiber 3 of the cable 2. The rear portion 13 has an axial passage portion 18 of the passage 14 and emerging from a rear end 19 of the alignment ferrule 11 for connection to the cable 2.

The alignment ferrule 11 includes, a radially enlarged collar 20 on the rear portion 13 and surrounding the ferrule 11, a stepped cylindrical surface 21 of the ferrule 13 intersecting a transverse front face 22 of the collar 20, and a circumferential groove 23 spaced from a transverse rear face 24 of the collar 20.

According to U.S. Pat. No. 4,834,487, the connector assembly 7 further includes, a snap ring mounted in the groove 23, a coupling nut 26 moveable axially over the alignment ferrule 11 and having a transverse radially projecting, inner flange encircling the alignment ferrule 11 forwardly of the snap ring, a coil spring 28 for compression directly in engagement against the rear face 24 of the collar 20 and for urging a force of compression against the inner flange of the coupling nut 26. The coupling nut 26 has bayonet type slots 30 for connection with a known complementary connector, not shown.

Figure 4:
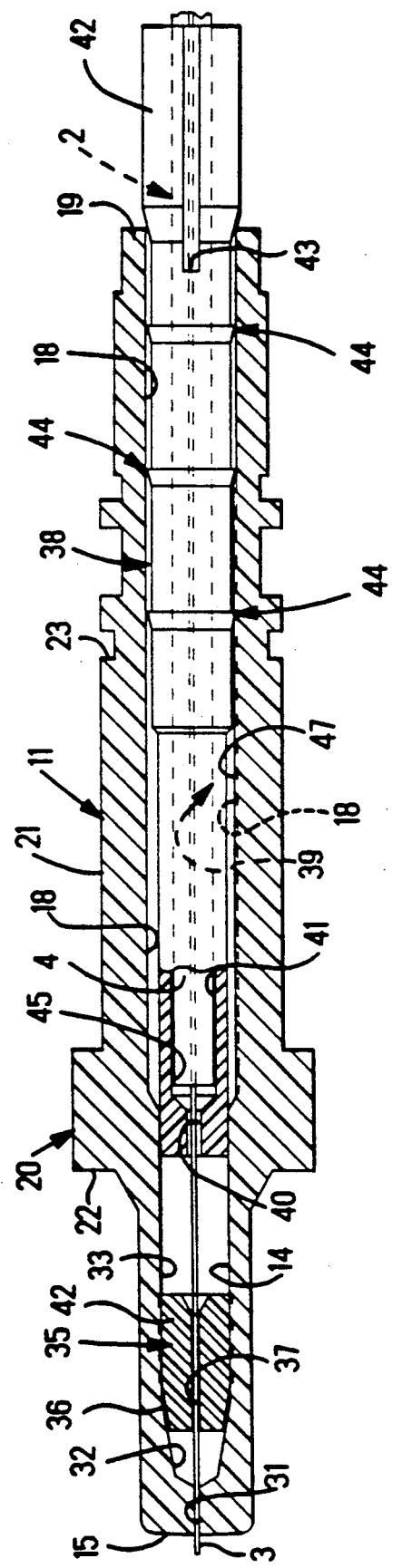
FIGS. 4 and 5 are elevation views in section of a cable and the connector as shown in FIGS. 1, 2 and 3.
Figure 5:
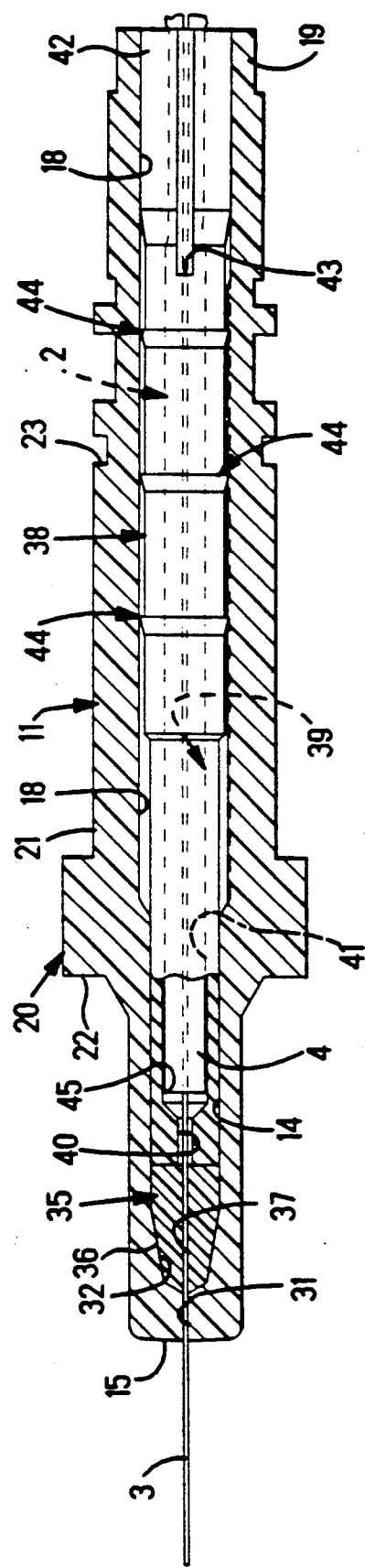
Figure 6:
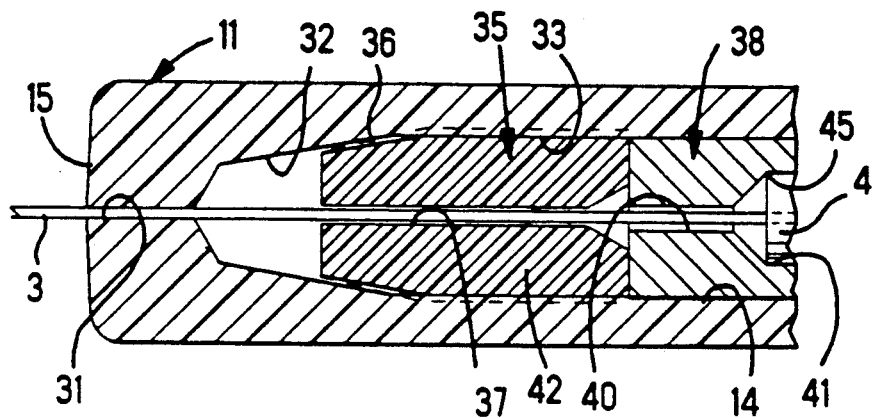
FIGS. 6 and 7 are enlarged fragmentary views of portions of the FIGS. 4 and 5.
Figure 7:
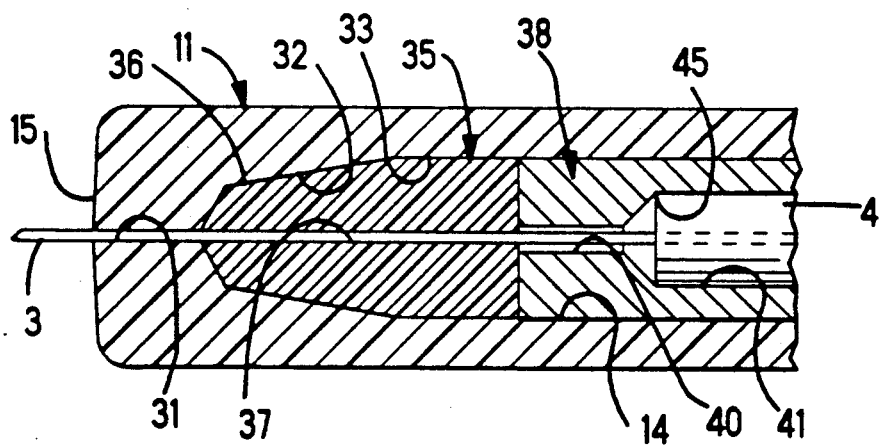

With reference to FIGS. 1, 4 and 5, a unitary alignment ferrule 11, is manufactured as described in U.S. Pat. No. 4,834,487. Further, the unitary alignment ferrule 11 is provided with a front end 15, a radially enlarged collar 20 with a transverse front face 22, a projecting alignment key and a transverse rear face 24. The alignment ferrule 11 includes a stepped cylindrical surface 21 that extends from the front end 15, intersects the front face 22 of the collar 20, and extends to the rear face 24 of the collar 20 and to a rear end 19.

With reference to FIGS. 1 and 4 through 7, portions of the passage 14 will now be discussed with reference to the unitary ferrule 11. A central, fiber receiving portion 31, sized to receive slidably the optical fiber 3, and being concentric with the front end 15, communicates with a tapered portion 32, in turn, communicating with a cylindrical portion 33, in turn, being continuous with the passage portion 18 extending to the rear end 19. Multiple, longitudinal slits 34, one shown in FIGS. 1 and 8, each extend through the rear end 19 and forwardly, and communicate with the passage portion 18. Transverse openings 46 to the rear of the collar 20 extend from the exterior of the alignment ferrule 11 and communicate with the passage portion 18 of the passage 14. The openings 46 are provided by a molding apparatus, not shown, and are left by stabilizing pins of the molding apparatus that hold a core pin stationary during molding of plastics material that forms the alignment ferrule 11. The core pin forms the passage 14 of the alignment ferrule 11. The openings 46 are covered by the coupling nut 26. Along the interior of the passage 18 is a series of spaced apart, longitudinal projections in the form of ribs 47 extending parallel to the axis, longitudinal, of the alignment ferrule 11. The ribs extend along the passage portion 18 and are spaced from the rear end 19.

With reference to FIGS. 3 through 7, an insert 35 is formed from a molded plastic material, with a frustoconical front 36 and a cylindrical rear and a concentric fiber receiving bore 37. The insert 35 is assembled into the unitary ferrule 11. The insert 35 is inserted into the passage 18 and then into the passage 14 from the rear, and is positioned with its frustoconical front 36 within the tapered portion 32.

Figure 8:
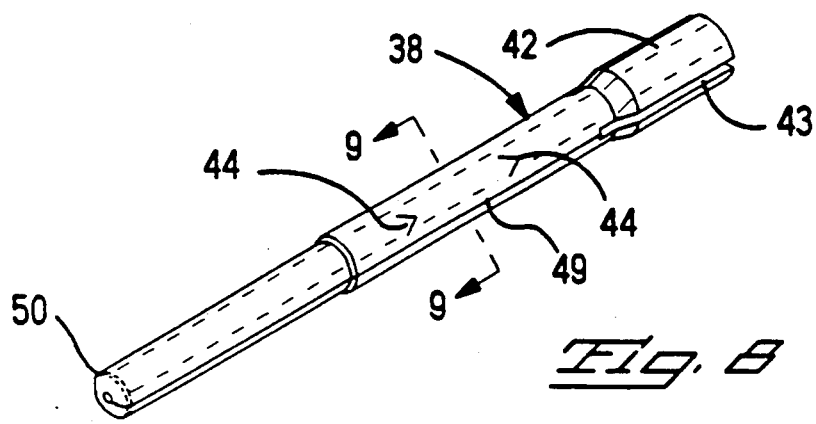
FIG. 8 is a perspective view of a plunger fabricated by stamping and forming operations.
Figure 9:
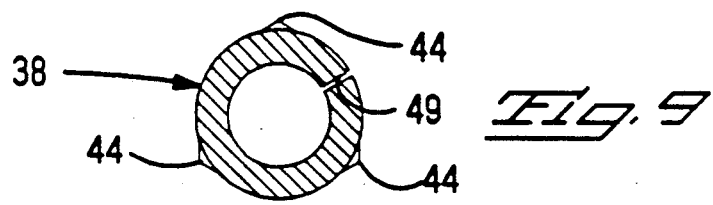
FIG. 9 is a section view taken along the line 9—9 of FIG. 8.
Figure 10:
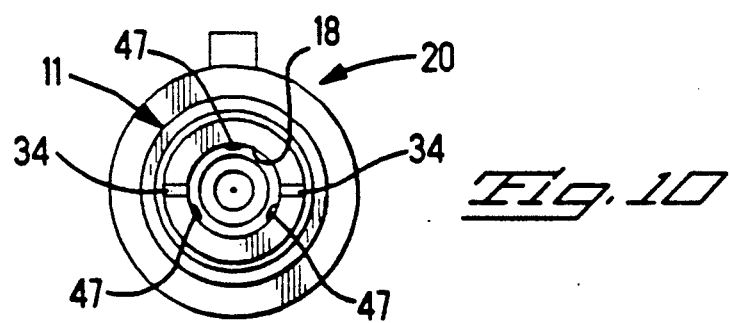
FIG. 10 is an end view taken along the line 10—10 of FIG. 2.
Figure 11:
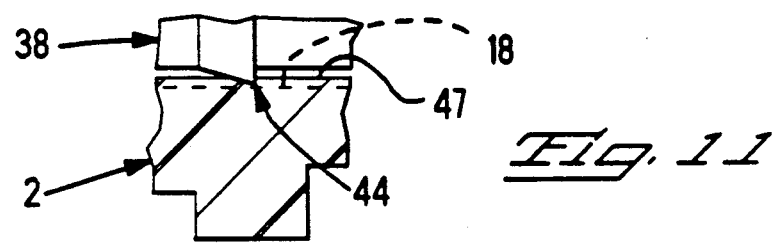
FIG. 11 is an enlarged fragmentary view of a portion of FIG. 4.

With reference to FIGS. 3 through 7, a plunger 38 having a stepped outer diameter, and an intermediate diameter, has a passage 39, with a reduced diameter, fiber receiving portion 40 at a front end, communicating with a buffer receiving portion 41 communicating with a rear end 42 of the plunger 38. Multiple slits 43, FIG. 3, extend longitudinally through the plunger rear end 42. The rear end 42 is thicker and is larger in external diameter than the intermediate diameter. Forwardly of the slits 41, the larger, intermediate diameter exterior of the plunger 38 is provided with a frictional surface 44, for example, a series of spaced apart, projecting, frustoconical barbs inclined from the rear to the front of the plunger 38. The barbs comprising the frictional surface 44 are aligned with corresponding ribs 47. The plunger 38 of FIG. 2 can be machined. The plunger 38 of FIG. 8 is formed by stamping and forming a flat sheet of metal into a cylindrical shape with a longitudinal seam 49 and rounded corner edges 50 at a front end. The barbs are continuous around the circumference of the plunger 38, as shown in FIG. 2, or, as shown in FIG. 8, are discontinuous about the circumference, and are punched out of the thickness of the sheet to project inclined from front to rear.

The plunger 38 is assembled part of the way along the passage 18, FIG. 4, in tandem with and behind the insert 35, with the slits 41 and the rear end 42 protruding from the rear end 19 of the alignment ferrule 11. A clearance 48 is defined between the passage portion 18 of the passage 14 and the external circumference of the plunger 38. This allows the outer circumference of the plunger 38 to freely enter the passage 14 from the rear end 19 until the barbs comprising the frictional surface 44 are moved forwardly along the passage 14 until they engage corresponding ribs 47. In addition, the enlarged rear end 42 is wedged against the entrance of the passage 18. The barbs project outwardly of the circumference of the plunger 38 and into the clearance 48. The ribs 47 also project into the clearance 48. Further forward movement of the plunger 38 causes the barbs comprising the frictional surface 44 to move along corresponding ribs 47, and being retained with a force fit, frictionally against the ribs 47, the rear facing edges of the inclined barbs being wedged against corresponding ribs and restraining rearward movement of the plunger 38. The plunger 38 inside the alignment ferrule 11 covers the transverse openings 46. The insert 35 is retained between a constriction, provided by the tapered portion 32, and the plunger 38 substantially without compression. Thereby, the connector 10 is partially assembled and is ready for shipment to a user of the connector 10.

In use of the connector 1, the strain relief boot 9 and the crimp ferrule 8 are assembled slidably over and along the cable 2, not shown. The optical fiber 3 and the buffer covered fiber 3,4 of the cable 2 are inserted along the passage 39 of the plunger 38 until the optical fiber 3 projects forwardly and projects successively along and through the fiber receiving portion 40 of the plunger 38 and the bore 37 of the insert 35 and the fiber receiving portion 31 of the passage 14. Movement of the cable 2 forwardly continues until, both the optical fiber 3 emerges from the passage portion 31 at the front end 15, and the buffer covered fiber 3,4 becomes stopped by the intersection 45 of the stepped diameters of the passage 39. Then the cable 2 and the plunger 38 are moved together as a unit forwardly of the alignment ferrule 11, by applying force to the rear end 42 of the plunger 38. Thereby, the protruding rear end 42 of the plunger 38 becomes assembled in the passage 18, with the rear end 42 being radially contracted and being force fit in the passage 18, and with the rear end 42 and the rear end 19 of the alignment ferrule 11 being concentrically aligned.

The plunger 38, with its forward movement, urges the optical fiber 3 further along the fiber receiving portion 31 of the passage 14, and urges the insert 35 forwardly within the passage 14. The plunger 38 compresses the insert 35 within a constriction provided by the tapered portion 32 of the passage 14. The insert 35 is compacted concentrically in the constriction, causing a further reduction in volume of the insert 35 and a concentric reduction in the diameter of the bore 37, which applies a concentric grip on the optical fiber 3, whereby the optical fiber 3 is forced into concentric alignment with the portion 31 of the passage 14 and is concentrically restrained from radial movement by the applied grip. With respect to the insert 35 of plastic material, the insert 35 must be retained under compression to prevent resilient expansion of the material. The insert 35 is retained under compression by restraining the plunger 38 from further movement. For example, the friction surface 44 of the plunger 39 is moved forwardly along the passage 18 to become force fit immovably in a new location, to be followed by assembly of the crimp ferrule 8, as will now be described.

The strength members 5 are positioned to overlap a knurled exterior of the rear 16 of the alignment ferrule 11, as disclosed in U.S. Pat. No. 4,834,487. The crimp ferrule 8 is moved along the cable 2 to clamp the strength members 5 against the exterior of the rear 16 of the alignment ferrule. The crimp ferrule 8 forms a radial constriction into which is received the rear 16. The slits 34 in the alignment ferrule 11 and the slits 41 in the plunger 38 permit the alignment ferrule 11 and the plunger 38 to collapse concentrically, applying compression concentrically against each other and against the buffer covered fiber 3,4, to restrain relative movement of parts with respect to the alignment ferrule 11. Especially, the parts are constrained from movement, thus, to maintain the insert 35 under compression to prevent a loosening of the grip on the optical fiber 3.

To complete the assembly, the strain relief boot 9 is moved along the cable 2 to encircle the crimp ferrule 8, and to interlock with the alignment ferrule 11. The strain relief boot 9 extends along apart of the cable 2 that projects from the end of the plunger and the rear end 19 of the alignment ferrule 11. The part of the optical fiber 3 that projects forward of the front end 15 is cut off, and the end surface of the optical fiber 3 is provided with an optical face by fracturing or by polishing.

We claim:

1. An optical connector comprising: an alignment ferrule having a passage receiving a plunger and receiving an insert between the plunger and a constriction of the passage, the plunger being constructed to receive an optical fiber and a buffer covering the optical fiber, and the plunger and the insert being constructed for movement forwardly of the passage to compact the insert in the constriction and to apply compression concentrically on the optical fiber, a clearance between the passage and a circumference of the plunger, barbs projecting outward from the circumference into the clearance, and ribs along the passage projecting into the clearance toward the barbs, and the barbs being force fit against the ribs and restraining the plunger from movement rearward of the passage.

2. An optical connector as recited in claim 1, wherein the ribs extend parallel to the axis of the passage.

3. An optical connector as recited in claim 1, wherein the plunger is held in the alignment ferrule with the plunger projecting from a rear end of the alignment ferrule prior to receiving the optical fiber.

4. An optical connector as recited in claim 1, wherein the insert is unitary with a fiber receiving bore.

5. An optical connector as recited in claim 1, comprising: a strain relief boot interlocking with the alignment ferrule.

6. An optical connector as recited in claim 1, wherein the circumference of the plunger extends forwardly of said barbs and is received slidably along said ribs in said passage.

7. An optical connector as recited in claim 1, wherein the alignment ferrule has transverse openings communicating with the passage, the openings being covered by the plunger in the passage.

8. An optical connector as recited in claim 1, wherein the plunger is in tandem with the insert.

9. An optical connector as recited in claim 1, wherein the insert is retained between the plunger and the constriction substantially without axial compression prior to the plunger receiving the buffer covered optical fiber.

10. A method of assembling an optical connector with a buffer covered optical fiber, comprising the steps of:

assembling a deformable insert and a plunger in a passage of an alignment ferrule of an optical connector together with a buffer covered optical fiber in the plunger, retaining barbs on the plunger with a force fit against projecting ribs along the passage, moving the plunger and the buffer covered optical fiber forwardly with respect to the alignment ferrule, compressing the insert in a constriction of the alignment ferrule and compressing the insert concentrically on the optical fiber, and restraining the plunger from further movement.

11. A method as recited in claim 10, and further comprising the steps of: securing strength members surrounding the buffer covered optical fiber to the alignment ferrule.

12. A method as recited in claim 10, and further including the step of:

radially collapsing the rear ends of the alignment ferrule and the plunger toward the buffer covered optical fiber.

* * * * *